United States Patent
Herrod

(10) Patent No.: US 7,225,260 B2
(45) Date of Patent: May 29, 2007

(54) SOFTWARE METHOD FOR MAINTAINING CONNECTIVITY BETWEEN APPLICATIONS DURING COMMUNICATIONS BY MOBILE COMPUTER TERMINALS OPERABLE IN WIRELESS NETWORKS

(75) Inventor: Allan Herrod, Mission Viejo, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 717 days.

(21) Appl. No.: 09/967,358

(22) Filed: Sep. 28, 2001

(65) Prior Publication Data

US 2003/0065784 A1    Apr. 3, 2003

(51) Int. Cl.
*G06F 15/16* (2006.01)

(52) U.S. Cl. .................. 709/227; 709/239; 709/232; 455/450

(58) Field of Classification Search ........... 709/220, 709/221, 232–324, 227, 223; 370/329; 455/450; 714/4
See application file for complete search history.

(56) References Cited

U.S. PATENT DOCUMENTS

| | | | |
|---|---|---|---|
| 5,587,577 A | 12/1996 | Schultz | 235/472 |
| 5,724,346 A | 3/1998 | Kobayashi et al. | |
| 5,812,865 A | 9/1998 | Theimer et al. | 395/800 |
| 5,832,196 A * | 11/1998 | Croslin et al. | 714/4 |
| 5,844,893 A | 12/1998 | Gollnick et al. | 370/329 |
| 5,867,661 A | 2/1999 | Bittinger et al. | 395/200.57 |
| 6,061,341 A | 5/2000 | Anderson et al. | 370/338 |
| 6,091,951 A | 7/2000 | Sturniolo et al. | 455/432 |
| 6,112,092 A * | 8/2000 | Benveniste | 455/450 |
| 6,115,615 A | 9/2000 | Ota et al. | 455/553 |
| 6,182,144 B1 * | 1/2001 | England | 709/232 |
| 6,198,920 B1 | 3/2001 | Doviak et al. | 455/426 |
| 6,198,941 B1 | 3/2001 | Aho et al. | 455/552 |
| 6,226,677 B1 | 5/2001 | Slemmer | 709/227 |
| 6,314,094 B1 | 11/2001 | Boys | 370/352 |
| 6,314,108 B1 | 11/2001 | Ramasubramani et al. | 370/465 |
| 6,434,530 B1 * | 8/2002 | Sloane et al. | 705/1 |
| 6,539,031 B1 * | 3/2003 | Ngoc et al. | 370/470 |
| 6,591,382 B1 * | 7/2003 | Molloy et al. | 714/704 |
| 6,751,461 B1 * | 6/2004 | Lee et al. | 455/450 |
| 6,857,026 B1 * | 2/2005 | Cain | 709/239 |
| 2001/0046867 A1 * | 11/2001 | Mizoguchi | 455/452 |
| 2002/0035637 A1 * | 3/2002 | Simmon et al. | 709/234 |
| 2002/0152293 A1 * | 10/2002 | Hahn et al. | 709/223 |

FOREIGN PATENT DOCUMENTS

| | | |
|---|---|---|
| WO | WO 99/66748 | 12/1999 |
| WO | WO 00/16532 | 3/2000 |

* cited by examiner

*Primary Examiner*—Jungwon Chang
(74) *Attorney, Agent, or Firm*—Kirschstein, et al.

(57) ABSTRACT

A method of maintaining connectivity and synchronization of data from a first application resident in a first mobile computer to a second application resident in a second computer wherein the data is transmitted over a data communications network including a plurality of stationary access points, determining, in said first mobile computer, that communications between the first mobile computer and the second computer has been impeded, and that association with a different access point or use of a different radio channel should be attempted in order to continue communications; storing and queuing the messages while a new link is established; and re-establishing a link between first and second virtual sockets in the respective computers in order to continue a session between the first and second applications in the first and second computer respectively.

6 Claims, 6 Drawing Sheets

SOFTWARE METHOD FOR MAINTAINING CONNECTIVITY BETWEEN APPLICATIONS DURING COMMUNICATIONS BY MOBILE COMPUTER TERMINALS OPERABLE IN WIRELESS NETWORKS

REFERENCE TO RELATED APPLICATIONS

This application is related to U.S. patent application Ser. No. 09/686,755 filed Oct. 10, 2000, now U.S. Pat. No. 6,675,203, which is a divisional of Ser. No. 09/166,816, now U.S. Pat. No. 6,694,366

BACKGROUND OF THE INVENTION

1. Field of the Invention

The apparatus and methods consistent with the present invention relates to portable computers, such as bar code reader computer terminals connected to wireless networks, and more particularly to the network architecture, operating system APIs, configuration software, and inter-network messaging and communications protocols needed to support communications between application programs being executed in separate mobile units operated in such networks, and from network to network.

2. Background of the Invention

Wireless local area networks use infrared or radio frequency communications channels to communicate between portable or mobile computer terminals and stationary access points or base stations. These access points are in turn connected by a wired (or possibly wireless) communication channel to a network infrastructure which connects groups of access points together to form a local area network, including, optionally, one or more servers or host computer systems.

One increasingly important type of mobile computer are those which are coupled to or incorporates a bar code symbol reader, and are now in very common use for portable data collection applications. Typically, a bar code symbol comprises one or more rows of light and dark regions, typically in the form of rectangle. The relative widths of the dark regions, the bars and/or the widths of the light regions, the spaces, encode data or information in the symbol. A bar code symbol reader illuminates the symbol and senses light reflected from the regions of differing light reflectivity to detect the relative widths and spacings of the regions and derive the encoded information. Bar code reading data collection application software, executing on such mobile computers, improve the efficiency and accuracy of data input for a wide variety of applications. The ease of data input in such systems facilitates more frequent and detailed data input, for example, to provide efficient taking of inventories, tracking of work in progress, and make use of applications programs that may communicate to and interoperate with other applications programs operating on a remote host or server which the mobile computer communicates with through a wireless network.

Wireless and radio frequency (RF) protocols are known which support the logical interconnection of mobile computers and roaming terminals having a variety of types of communication capabilities to host computers. The logical interconnections are based upon an infrastructure in which at least some each of the remote terminals are capable of communicating with at least two of the access points when located within a predetermined range therefrom, each terminal unit being normally associated with and in communication with a single one of such access points. Based on the overall spatial layout, response time, and loading requirements of the network, different networking schemes and communication protocols have been designed so as to most efficiently regulate the communications between a given terminal and the network through the selected access point. One such protocol is set forth in the ISO/IEC 8802-11, or ANSI/IEEE Std 802.11 entitled "Wireless LAN Medium Access Control (MAC) and Physical Layer (PHY) Specifications" (1999 edition) available from the IEEE Standards Department, Piscataway, N.J. (hereinafter the "IEEE 802.11 Standard").

There are a variety of currently deployed and emerging wireless communications standards for cellular voice and data communications, often referred to as "wide area networks" (WANs) to distinguish them from local area networks. First generation wireless systems (1G) utilized analog technology. Second generation (2G) systems, using digital technology, were introduced in the mid 1990s including GSM, or the "global system for mobile communications", and CDPD or "cellular digital packet data". GSM utilizes time division multiplying over a 200 kHz channel. CDPC transmits data over dedicated 30 kHz cellular channels at speeds up to 19.2 kbps. Systems referred to a 2.5G offer mobile data services at rates from 56 kbps to 144 kbps, while 3G systems will operate at data rates from 144 kbps to 2Mbps.

One of the most important technologies for wireless communications is CDMA. In a spread spectrum system, one can multiplex users by assigning them different spreading keys, which is called a code division multiple access (CDMA) system. The CDMA modulation technique is one of several techniques for facilitating communications in which a large number of system users are present in the coverage area of a base station. The use of narrowband CDMA in a digital cellular spread spectrum communications system was adopted by the Telecommunication Industry Association in 1993 as TIA/EIA standard IS-95.

Currently deployed 800, 900 MHz band systems include AMPS, TDMA /IS-136, CDMA/IS-95, iDEN, GSM, and I-mode. Other emerging network standards include cdma-One, CDMA 1X, and 1XEV DV (in which voice and data share a 1.25 MHz channel). There are several technologies that fall under terminology of 2.5G. For example, 1XRTT is the technology for upgrading CDMA networks. Another widely discussed 2.5G technology is GPRS (the General Packet Radio Service), intended for upgrading GSM networks. GPRS was initially deployed in 2000 and operates using multiple time slots that can each carry data at 1s4.4 kbps.

Other multiple access communication system techniques, such as time divisional multiple access (TDMA), frequency divisional multiple access (FDMA) and AM modulation schemes such as amplitude companded single sideband (ACSSB) are known in the art. The use of CDMA techniques in a multiple access communication system is disclosed in U.S. Pat. No. 4,901,307. The framing and transmission of data using the Internet Protocol (IP) over a CDMA wireless network is described in TIA/EIA/IS-707-A, entitled "Data Service Options for Spread Spectrum Systems", referred to as IS-707.

The International Telecommunications Union recently made a call for proposals for methods of providing high rate data and high quality services over wireless communications channels. A first of these proposals was prepared by the Telecommunication Industry Association, entitled "The cdma2000 ITU-R RTT Candidate Submission", often referred to as cdma2000. A second of these proposals was issued by the European Telecommunications Standards Institute (ETSI), entitled "The ETSI UMTS Terrestrial Radio Access (UTRA) ITU-R RTT Candidate Submission", also known as wideband CDMA or W-CDMA. A third proposal was submitted by U.S. TG 8/1 entitled "The UWC-136 Candidate Submission", and is referred to as EDGE.

EDGE is an acronym for "Enhanced Data for GSM Evolution". EDGE is an enhanced modulation technique that is backward compatible with GSM networks, and provides throughput three times that of GPRS. The contents of these submissions are public record and are known in the art.

One important future network is UMTS/IMT2000. The UMTS Forum is a non-profit organization for publicizing established in 1996 to increase awareness of the UMTS/IMT-2000 third-generation mobile communications systems. In establishing the forum, members intended to create a standard for 3G applications and services that would be globally interoperable and can be accessed by any mobile device from anywhere in the world. Universal Mobile Telecommunications System (UMTS) is a service based on the global system for mobile (GSM) communications standard.

The general concept of seamless roaming among multiple networks is known in the prior art. U.S. Pat. No. 6,091,951 describes a plurality of networks (LANs and WANs) wherein the mobile terminal is registered to at least one access point in one of the networks. The mobile terminal is assigned a first network address, and when the mobile terminal is registered to at least one access point in another of the plurality of LANs, the mobile terminal is assigned a second network address being different form the first network address. The system includes a gateway controller, coupled to the LANs, for serving as an intermediary for communications between the mobile terminal and the system backbone so order that in the event the mobile terminal is assigned a different network address by virtue of registering with an access point in another of the LANs, the device is able to maintain communications with the mobile terminal without requiring knowledge of a change in the network address of the mobile terminal.

More particularly, U.S. Pat. No. 6,091,951 patent describes a seamless communications transition involving a first mobile terminal and device, and a second mobile terminal and the device. A first mobile terminal may suspend a previously established session between the first mobile terminal and a device. The first mobile terminal notifies the gateway through which the session is established that the mobile terminal wishes to suspend the session. Rather than terminating the session, the gateway is configured to maintain the session in its tables and begin buffers in memory any information received via the network intended for the first mobile terminal. In the event a second mobile terminal wishes to resume the session at a point at which the first mobile terminal suspended the session, the second mobile terminal then notifies the gateway. The second mobile terminal then notifies the gateway that it wishes to resume the session suspended by the first mobile terminal. The gateway is configured to begin in turn to forward communications between the device and the second mobile terminal in place of the first mobile terminal.

Any information which has been buffered by the gateway is sent to the second mobile terminal together with state information regarding the state of the connection between the first mobile terminal and the gateway at the time of the suspension. As a result, the second mobile terminal can pick up where the first mobile terminal left off without completely terminating an initial session and restarting a new session.

Another feature of the present invention relates to the implementation of APIs for different communication interfaces. One approach, as noted in prior art U.S. Pat. No. 6,044,408, utilizes a software architecture with APIs that include a service that returns information on the hardware and software capabilities for the respective media type. The hardware capabilities refer to the attributes and functionality of the underlying hardware, while the software capabilities refer to the functions of the available software emulators. This service enables applications to capabilities, an application can choose for example, to exploit a certain function if available in the hardware, or avoid using the function if only provided in software. Also, an application can choose to use its own software emulation if a particular hardware function is not available.

To take advantage of this service, an application can invoke it at initialization to learn the available capabilities. The application can then optimize itself based on the reported available capabilities. If the application does not invoke the service, but instead attempts to use a capability that is not available, the API will tell the application that the capability is not available by returning an error parameter.

The APIs can also optimize a particular API request even in cases in which the application has not done so. To optimize an API request, the API breaks down the request in to the individual capabilities needed to process the request. It then determines whether the capabilities for the request are available hardware capabilities. If so, it instructs the hardware to carry out the request and passes in the necessary parameters.

Most relevant to the present invention, if the necessary hardware capabilities are not available to handle the API request, the API determines whether the capabilities for the request are available software capabilities. If so, the API handles the request using the available emulators. Otherwise, the API tells the application that the API request cannot be processed by returning an error in most cases.

Prior to the present invention, there has not been a simple, automatic technique without the use of a network management unit or gateway controller which would allow a user of a mobile computer to maintain connectivity and continuing in data exchange operations of applications programs with a remote computer when communications over a wireless local area network between the computers, and synchronization between the applications executing therein, become impeded or interrupted.

SUMMARY OF INVENTION

1. Objects of the Invention

It is a general object of the present invention to maintain communications connectivity between applications in remote processor units in a computer network.

It is another object of the invention to provide a method for allowing applications running on different clients in a network to continue network data transfer operations, or to suspend and resume operations, by adapting to variable network data transfer conditions.

It is a further object of the present invention to provide a software module that establishes virtual sockets in the respective remotely located computers and in response to each connection request by an application for transferring data between computers, determines the most suitable channel and corresponding virtual sockets in each computer to enable a connection between the application in the first computer and a second application in the second computer over the external communication link.

It is another object of the present invention to provide software in a mobile unit for assuring that connectivity is maintained between different applications by switching communication channels, paths or protocols as may be required.

It is another object of the present invention to provide a software facility in a mobile unit for assuring that logical connectivity is transparently maintained between applications executing in remote units, regardless of lower level software operations of switching software sockets, communication ports, communication channels, network paths or protocols as may be required for physical media or network reasons.

It is another object of the invention to provide a method for allowing applications designed for use with a standard communications API for wired computer networks to operate in wireless communications networks by utilizing additional API features that adapt to less reliable network data transfer conditions.

It is still a further object of the present invention to provide a virtual socket API to interface to standard commercially available communication interface APIs in the computer, and in response to each connection request by the first application, for processing and transferring data originated by the first application, to a corresponding API in the second computer, to enable a connection between an application in the first computer and a second application in the second computer over an external communication link.

It is an even further object of the invention to provide a method which can be used to accomplish one or more of the above objectives.

Additional objects, advantages and novel features of the present invention will become apparent to those skilled in the art from this disclosure, including the following detail description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

2. Features of the Invention

The present invention provides a method of maintaining connectivity of data communication from a first application resident in a first mobile computer to a second application resident in a second computer wherein the data is transmitted over a data communications network by determining, in the first mobile computer, that communications between the mobile computer and the second computer has been impeded, and that association with a different network gateway or access point or use of a different radio channel should be attempted in order to continue communications: The method further provides for storing and queuing the data messages in each respective computer while a new link is established; and re-establishing a link (or changing the operating characteristics of the same link) between in the respective computers in order to continue a session between the first and second applications in the first and second computer respectively.

The present invention also provides a method of maintaining connectivity and synchronization of data from a first application resident in a first mobile computer to a second application resident in a second computer wherein the data is transmitted over a data communications network including a plurality of stationary access points and at least one communications controller in communication with the access points, and a plurality of remote mobile computers, at least some of the mobile computers being capable of communicating with at least two of the access points when located within a predetermined range therefrom and being normally associated with and in communications with a single one of such access points, each computer having a unique user address, the steps include establishing communication and association between a first mobile computer with a first access point and with said communications controller associated with such access point through an associated port of the communications controller; registering the user address of said first mobile computer with said communications controller; utilizing the communications controller for processing messages destined for the first mobile computer and transferring such processed messages through the communications controller to the associated access point and the first mobile computer; establishing a first virtual and real sockets in the first computer in response to each connection request by the first application for processing data originated by the first application and corresponding second virtual and real sockets in the second computer to enable a connection between the first computer to a second application in the second computer over the external communication link; establishing in the second computer a second virtual socket for each connection request by the first application wherein the second virtual socket corresponds to a first virtual socket established in the first computer. The invention further provides subsequently determining, in said first mobile computer, that communications between the first mobile computer and the second computer has been impeded, and that association with a different access point or use of a different radio channel should be attempted in order to continue communications; and storing and queuing the messages while a new link is established. Finally, the inventor provides re-establishing a link between said first and second virtual sockets in order to continue a session between the first and second applications in the first and second computer respectively.

The novel features and characteristics of the invention are set forth in the appended claims. The invention itself, however, as well as other features and advantages thereof, will be best understood by reference to a detailed description of a specific embodiment, when read in conjunction with the accompanying drawings.

DESCRIPTION OF DRAWINGS

Like reference symbols in the various drawings indicate like elements.

DESCRIPTION OF THE PREFERRED EMBODIMENT

Figure 1:
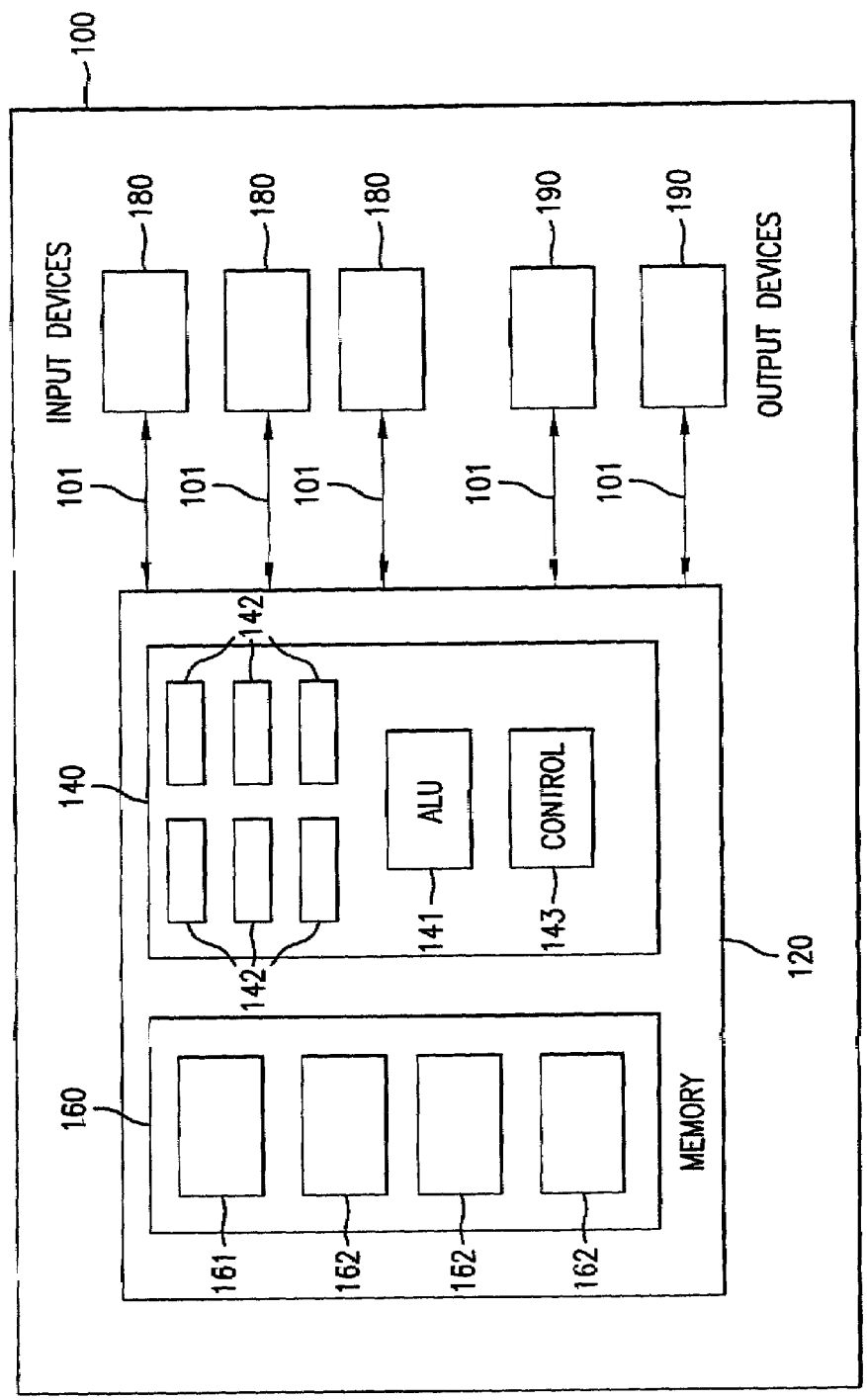
FIG. 1 illustrates a block diagram of a mobile unit.

Details of the present invention will now be described, including exemplary aspects and embodiments thereof. Referring to FIG. 1, an operating environment for the preferred embodiment of the present invention is depicted in highly simplified block diagram form, illustrating a mobile computer unit 100 with a computer subassembly 120 that comprises at least one high speed processing unit 140 (CPU), in conjunction with a memory subsystem 160, an input device 180, and an output device 190. Moreover, these elements are interconnected by a bus structure or individual interface connections 101.

The illustrated CPU 140 is of familiar design and includes an ALU 141 for performing computations, a collection of registers 142 for temporary storage of data and instructions, and a control unit 143 for controlling operation of the unit. Any of a variety of processors, including those from Intel, Motorola, NEC, Cyrix, AMD, Nexgen and others are equally preferred for CPU. Although shown with one CPU, the computer subassembly system may alternatively include multiple processing units.

The memory subsystem 160 includes main memory 161 and secondary storage 162. Illustrated main memory 161 is high speed random access memory (RAM) and read only memory (ROM). Main memory can include any additional or alternative high speed memory device or memory circuitry. Secondary storage 162 takes the form of long term storage, such as ROM, optical or magnetic disks, organic memory or any other volatile or non-volatile mass storage system. Those skilled in the art will recognize that memory can comprise a variety of and/or combination of alternative components.

The input and output devices 180 and 190 are also standard and well known. The input device 180 can comprise a keyboard, keypad, touch screen, trigger switch, buttons, thumb wheel, bar code reader, digital imager; video camera; mouse, track ball device, audio device (e.g., a microphone, etc.), or any other device providing input to the computer unit. The output device 190 can comprise a display, such as a liquid crystal display (LCD), a printer, an audio device (e.g. a speaker, etc.), or other device providing output for the computer unit. The input and output devices can also include network connections, radio transceivers, modems, or other devices used for communications with other computer units or devices.

Figure 2:
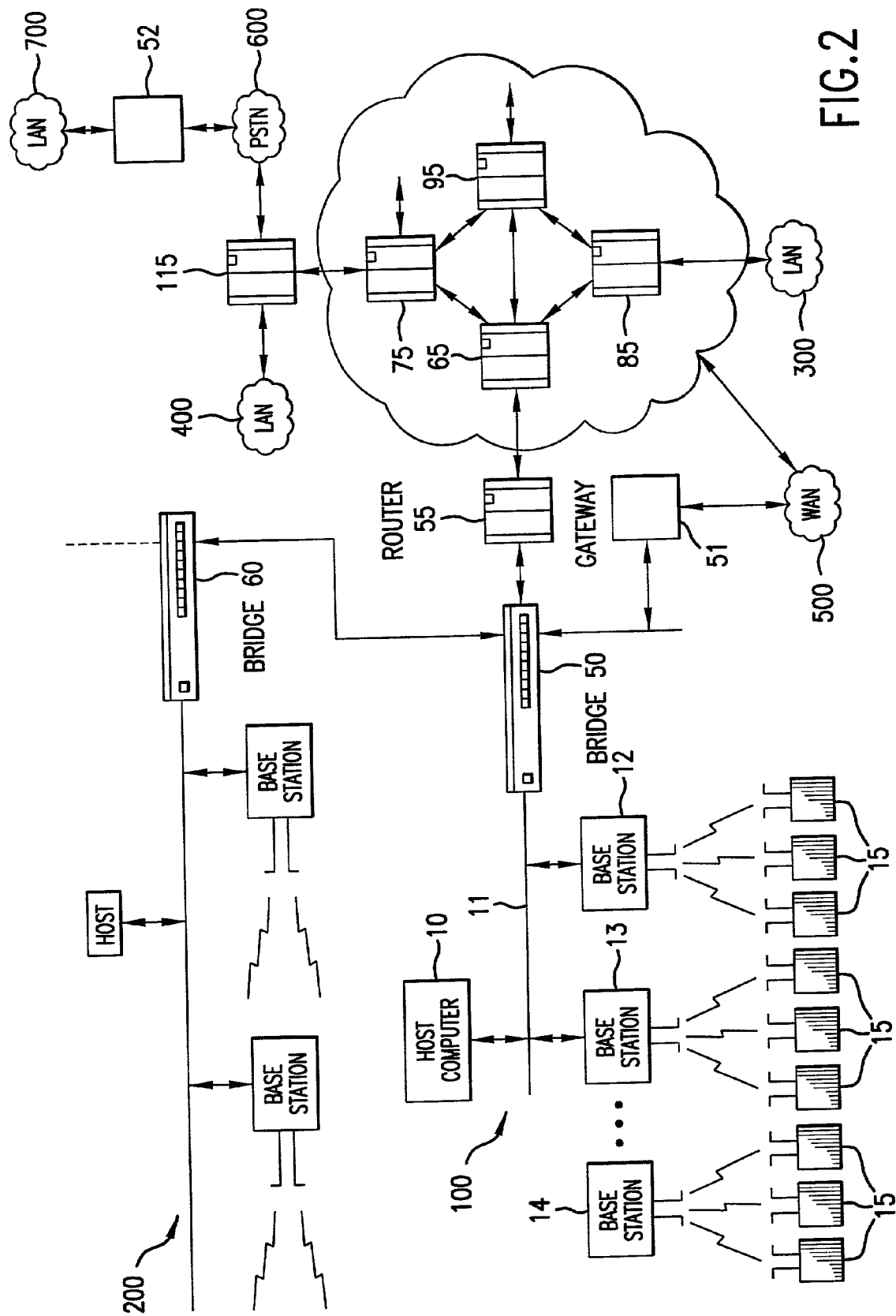
FIG. 2 illustrates a network environment in which the present invention can be implemented.

FIG. 2 shows a diagrammatic representation of a typical networking environment consistent with the present invention in a preferred embodiment of the home, small office, school, or similar public or private space, designated as reference number 100. The physical hardware components reside at the lowermost OSI layer, or physical layer, and include various nodes distributed along the network link or cabling. Although the term "node" broadly refers to all types of physical devices attached to the network link, only client and server nodes are depicted in FIG. 2.

More specifically, FIG. 2 illustrates clients and servers interconnected through a network link, although additional clients and servers, as well as other types of nodes, may be distributed along the network link as well. As used in this specification, the term "client" will generally denote a peripheral device or network appliance of some type associated with a user. The term "server" includes any device directed for controlling and coordinating shared usage of an network resource, such as an access point, storage unit, or printer, or website content or data.

Referring now to the figures, FIG. 2 shows a data communications network according to one embodiment of the invention. A first local area network 110 is illustrated, which is a preferred embodiment includes a host processor 10 connected by a wired communications link 11 to a number of stationery access points or base stations 12,13; other base stations 14 can be coupled to the host through the base stations or by an RF link. Each one of the base stations 12,13,14 is coupled by an RF link to a number of remote portable mobile units 15. In one embodiment, the portable mobile units 15 are hand-held, battery-operated data terminals, or voice communication handsets such as described in U.S. Pat. Nos. 5,029,183; and 6,119,944 all assigned to Symbol Technologies, Inc., and each incorporated herein by reference. In addition to the architecture shown if FIG. 2, wireless internet working nodes may also be used, such as described in U.S. Pat. No. 5,901,362 of IBM, which is hereby incorporated by reference, or as an ad-hoc network without fixed or base stations.

Although hand-held, laser scanning bar-code reader data terminals are mentioned, the data terminals may also include bar-code readers of the CCD or wand type, and may be portable voice communication handsets, pagers, still image or video cameras, cellular telephones, AM/FM radio broadcast receivers, or any combination of the foregoing. Other types of data gathering devices may be utilized as terminals and use the features of the invention, such as temperature, pressure, or other biophysical or environmental measuring devices, event counters, voice or sound activated devices, intrusion detectors, etc.

Various other types of portable terminals may be advantageously employed in a network having features of the invention; these portable terminals ordinarily could utilize data entry devices such as keyboards, touch screens, floppy magnetic disks, CD ROMs, PC cards or compact flash (CF) cards, magnetic stripe cards, RFID tags, biometric ID sources, SIM devices, smart cards, electronic key (e.g. "Ving") access cards, or the like, as well as data output devices such as displays, printers, audio speakers, buzzers, vibrators, disk drives, CD ROM "burners", or other I/O devices for providing an alert, display, or copy on suitable media of the information detected, transmitted and/or received by the terminal. In this embodiment used as an illustrative example, there may be from one up to sixty-four of the base stations (three stations being shown in the Figure) and up to several hundred of the remote portable units; of course, the network is scalable and may be expanded by merely changing the size of address fields and the like in the digital system, as will appear, but a limiting factor is the RF traffic and attendant delays in waiting for a quiet channel.

The first LAN 100 may be coupled to additional LANs 200, 300, 400 etc. through controllers such as bridges 50, 60, etc. or routers 55, 65, 75, 85, etc., or to a WAN 500 through a gateway 51; to the Public Switched Telephone Network (PSTN) 600 through a gateway 115. The PSTN may also couple to other LANs 700 through a gateway 52.

The network may also include a server 95 which may be associated with an Internet site, and may include a plurality of software components that can be accessed by agent program. Such components may include one or more object classes including applets, servlets, Java Beans™, or in general any executable unit of code.

The server may be a directory server or standard database management system. The server 95 may include facilities for address translation, formatting, storage, and encryption key management, among others.

These larger or more complex communications networks, as seen in FIG. 2, would ordinarily be used in a manufacturing facility, office building complex, warehouse, retail establishment, shopping malls, or like commercial or public facility, or combination of these facilities, where the data-gathering terminals or mobile units would be used for inventory control in stockroom or receiving/shipping facilities, at checkout (point of sale) counters, for reading forms or invoices of the like, for personnel security checking at gates or other checkpoints, at time clocks, for manufacturing or process flow control, for providing information to customers (such as location, and directions to a site or person) and many other such uses.

The steps carried out by a mobile unit 15 which is not currently associated to an access point in selecting an access point according to the IEEE 802.11 standard are described as follows. The mobile unit (MU) sends out a probe packet to all access points (APs), typically at the lowest data rate it is otherwise able to use with the network. The probe packet contains the mobile unit source address but has no destination address and hence any access point that detects the probe packet and is capable of responding at the same data rate must send a response. Accordingly, the probe packet is detected by all access points within range and a subset of those access points sends out a probe response packet. An evaluation of the signal quality and possibly other factors is made by the MU of the communications with the most eligible access point (if any) at the highest data rate. If such communications are acceptable, the MU will associate with the selected AP.

If the MU is already associated with an access point and operating at a data rate lower than the highest data rate, then depending upon the performance statistics (to be described below), it will carry out an update probe at predetermined intervals to see if it can operate at a higher data rate, and associate with a new AP at the higher data rate. Such association with different AP, known as roaming, is typically encountered when the MU is moved in and out of range, e.g. to and from the periphery of the range of the original AP, but may occur even if the mobile unit is motionless during conditions of fluctuations in traffic on the AP with which the MU is associated.

The MU can be used for a variety of information retrieving and computing purposes including but not limited to Internet access, data base lookup, order entry, messaging, document preparation and word processing, scheduling, mathematical computation, and the like. For these purposes, MU are provided with operating system software. In an embodiment, the operating system can be Windows CE, Windows 9x, Windows 2000, or NT platforms or the Stinger version of Windows CE. In other embodiments, the operating system can be Mac OS, Palm OS, Symbian Generic Technology, VRTX RTOS, or Linux. In one embodiment, the memory 161 can be random access memory into which the operating system is loaded. In another embodiment, the memory 161 can be any type of firmware such as EPROM or EEPROM into which the operating system is "burned".

The base stations 12, 13, 14 each utilize a an RF transceiver connected to an antenna for RF transmission and reception from the remote units 15 using a transmit/receive exchange protocol. In one embodiment, the exchange protocol is similar to a collision—sense multiple access (CSMA). An additional RF transceiver can be used as an RF link to and from other base stations, if necessary.

Base stations 12, 13, 14 are typically stationary units that use line power and often not accessible to an operator. The RF signal path in a typical environment is changeable because equipment in the environment may move around as well as the locations of the remote units 15. As a result, the particular base station that is in communications with the remote 15 can change. In an implementation, a "hand-off" protocol is used to change the base station that is designated to communicate with the remote unit 15. In this manner, a remote unit 15 has a confirmed virtual link with only one base station at a time, although other base stations may be in range. The base stations 12, 13, 14 act as intermediaries for the communication link between the remote unit 15 and the host computer 10. The main function of the base stations 12, 13, 14 is to relay data between the remote units 15 and the host computer 10.

Figure 3:
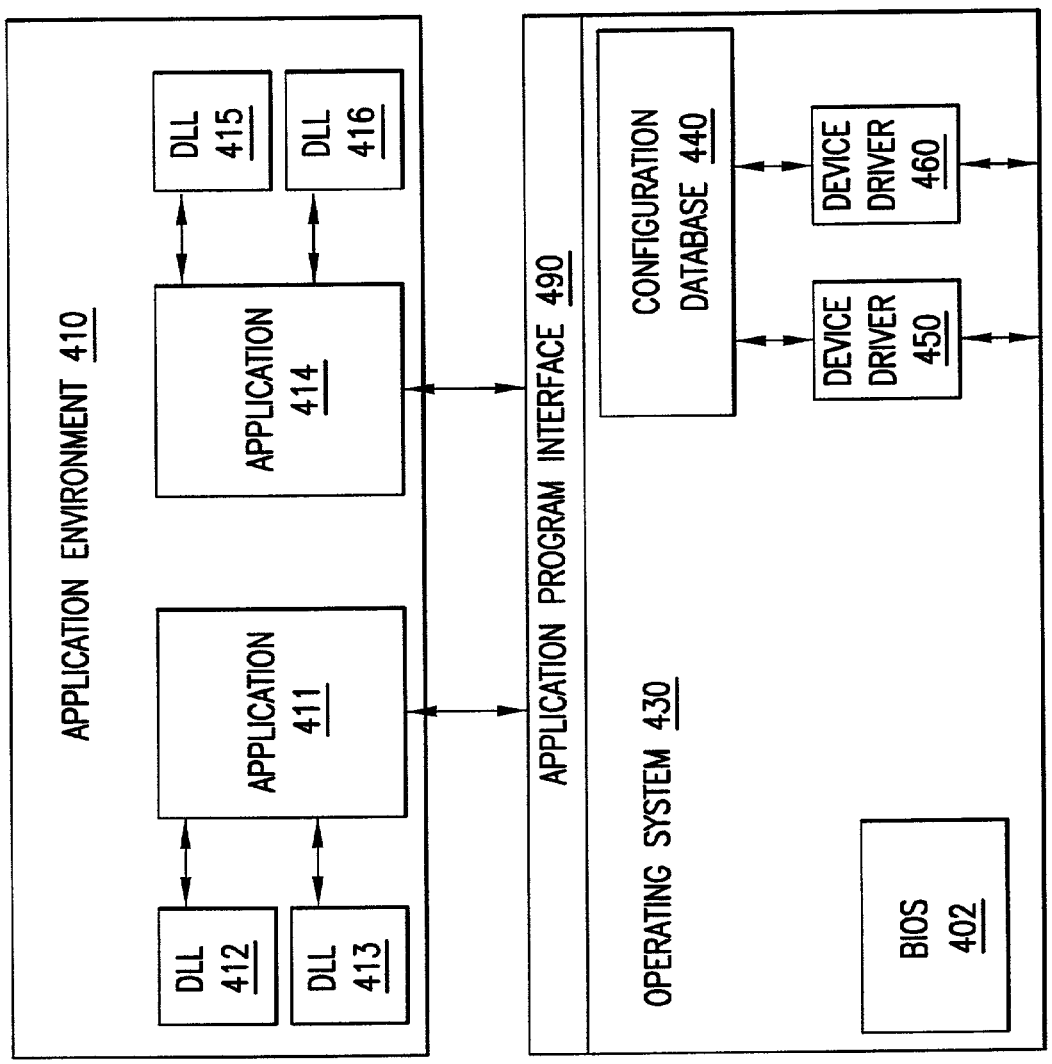
FIG. 3 illustrates an operating system and application environment in the mobile unit.

FIG. 3 illustrates an operating system having an application environment. As discussed above the operating system 430 can be one of the various Windows environments. The operating system 430 provides software to manage configure, enable and allocate physical resources of the MU 15. For example, the operating system 430 may include a memory allocation algorithm to allocate the memory 161 among various software tasks. Additionally, the operating system includes instructions from the memory to control the RF transmissions and receptions as well as data flow between the data acquisition device and the RF transceiver.

Since the present invention is implemented in software, a more detailed background discussion of standard operating system features is in order. The Windows client/server operating system provides shareable resources, such as files, memory, processes and threads, which are implemented as "objects" and are accessed by using "object services." As known in the art, an "object" is a data structure whose physical format is hidden behind a type definition. Data structures, also referred to as records or formats, are organization schemes applied to data so that it can be interpreted, and so that specific operations can be performed on that data. Such data structures impose a physical organization on the collection of data stored within computer memory 16 and represent specific electrical, magnetic or organic elements.

An "object type," also called an "object class," comprises a data-type, services that operate on instances of the data type, and a set of object attributes. An "object attribute" is a field of data in a object that partly defines that object's state. An "object service" implements and manipulates objects, usually by reading or changing the object attributes. "Object oriented design" is a software development technique in which a system or component is expressed using objects.

An object typically has two components; a function table, containing a pointer to each object member function (i.e. sometimes known as an object method) defined in the object's class, and a data block, containing the current values for each object variable (i.e. data members, sometimes known as an object property). An application has some reference to the object components through an object pointer. An application obtains this object reference by using a function call (direct or implied) in which that function allocates the object block in memory, initializes the function table, and returns the reference to said memory to an application.

Processes are implemented as objects. A process object comprises the following elements: an executable program; a private address space; system resources (e.g., communication ports and files) that the operating system allocates to the process as the program executes; and at least one "thread of execution." A "thread" is the entity within a process that the operating system kernel schedules for execution. As is well known in the art, each thread has an associated "context", which is the volatile data associated with the execution of the thread. A thread's context includes the contents of system registers and the virtual address belonging to the thread's process. Thus, the actual data comprising a thread's context varies as it executes.

An application environment 410 contains one or more software application processes 411, 414. The applications 411, 414 can be any variety of applications for use on the remote unit 15. For example, the application 411 can be a browser for connecting to a network such as the Internet, or for data collection and entry into a form or template by bar code scanning. The application 414 can be a configuration program that configures the remote unit 15 for use with the network to which the remote unit 15 connects.

Many computer application programs such as those used in data collection, inventory control, databases, word processors, spreadsheets and the like employ graphical user interfaces (GUIs) which make the use of the application "user friendly". A graphical user interface provides simple interactive tools for the input, manipulation and display of data as ell as program execution control through the use of windows, icon, menus, tool bars, scroll bars, command button, option button, text input boxes, dialog boxes and the like. By providing a graphical user interface, the applications developer enables the operator to run the application intuitively and with minimal or no training.

Standard development tools exist which facilitate the development of graphical user interface applications. Using a typical forms-based GUI design tool, a GUI application is divided into screens called forms which represent the major subdivisions of the user interface. Each form is composed of objects or controls with associated fields which allow data entry by the operator, display data from the program, provide instructions to the operator, allow operator control of the program, and the like. Types of controls available in commercially available GUI development tools include text boxes for alphanumeric data entry by the operator, check boxes for yes/no data entry by the operator, option buttons for choice selection by the operator, command buttons to facilitate predefined event procedures, object frames for display of a graphical object to the operator, and labels for displaying information on the form such as operator instructions.

Each control type is defined by a particular subset of properties taken from a set of standard properties which are common to all control types. Property values determine the look and behavior of the control. For example, every control has a control name property, a control type property, and a caption property. In addition, certain control types have may have unique properties not used by the other control types.

Applications developers implement their programs by selecting controls from a menu of control types and placing control in the desired location on the form. The properties associated with the control type select are then defined by the developer in order for the control to behave in desired fashion. Each control type is implemented by a code module that defines the behavior for that control type which can be adjusted by setting the values of the properties defined for that control type. For example, a text box control type accepts data input into its associated field from the keyboard. In a calculation application, a text box allows the operator to enter numbers from the keyboard for subsequent arithmetic computation. Other types of control execute specified routines selected. Thus, in the bar code scanning application, the operator would use key, trigger switch, or can icon to select a command label SCAN DATA ENTER, which call a subroutine to activate a bar code reader and receive data input.

By using predetermined control types, an operator can learn to use different graphical user interfaces quickly since they appear to operate in the same fashion. That is, a command button appear the same to the operator o different applications, and the operator will expect it to operate in the same fashion regardless of the particular application. A prime example of this are programs written for operation in the WINDOWS environment, where different programs have similar elements such as pull-down menus, window size control buttons, help menus and dialog boxes which operate in a similar fashion in all applications.

It is desired to be able to develop such graphical user interfaces for use in applications associated with data terminals and similar and similar devices having automatic data input capabilities such as bar code scanning. Data terminals have many applications where an operator desires to collect data either by keyboard entry or by automatic entry such as by scanning a bar code resident on a parcel package, product label, shelf tag or the like. In particular, it is desired to be able to allow the operator to have the option of either scanning a bar code with the target data encoded therein, or to enter data directly into the application if the bar code is damaged an d unreadable. By providing a graphical user interface which allows both manual keyboard data entry as well as automatic bar code scanning data entry into the same field, data terminal operators can benefit from the userfriendliness and intuitive features of such graphical user interfaces.

Programmers who desire to implement automatic data entry such as bar code scanning with selecting communications links, or attributes of such links, into a single applications have been heretofore constrained to develop routines and decide on case by case basis, which is time consuming, tedious, and costly. Most often, the applications so developed was different every time, so that operators always had to re-learn each new application.

The present invention furnishes applications developers with a standard methodology in an applications development environment for integrating such bar code input capabilities in a convenient manner as is currently available with other features of graphical user interfaces for maintaining communications connectivity in local area, or wide area, network environments with hand-offs between the two.

The present invention also provides a custom control for a graphical user interface which is scan-ware in that it facilitates the input of text data into the field by either manual keyboard input of by an automatic bar code reading device.

The present invention also provides such a scan-aware custom control which operates in an intuitive fashion so as to enable an operator to use it with little or no instruction, and integrates with exiting application development environments and which operates in a similar fashion to existing standard controls so as to be easily implemented by an applications developer.

Each application 411, 414 can have one or more processes 412, 413, 415, 416 respectively, associated with them. These processes can serve a variety of purposes related to the applications 411, 414. For example, one or more of the processes can be a dynamic link library (DLL) 412, 413, and 415, 416 respectively associated with it. A DLL is a feature of Windows platform that allow executable code modules to be loaded on demand and dynamically, and linked at run time. Library code can be updated, transparent to the application 411, 414, and unloaded when no longer needed.

The operating system 430 can include an application programming interface 490 (API). The API 490 is the software that the application processes 411, 414 use to request and carry out lower level services performed by the operating system 430. For Windows, the API also helps applications 411, 414 manage windows, menus, icons and other graphical user interface (GUI) elements. The API 490 includes a set of standard software interrupts, calls and data formats applications 411, 414 use to initiate contact with device drivers 450, 460.

The operating system 430 can include one or more device drivers 450, 460. The device drivers 450, 460 provide control functionally specific to a particular physical device or class of devices. Additionally, the device drivers 450, 460 provides standard software interfaces allowing other system components to access the controlled device. For example, one device driver 450 can control the code data acquisition device 343 and provide data to and from applications 411, 414 through the API 490. The other device driver 460 can control the RF transceiver 344 that allows data to be transferred from operating system 430 to the RF transceiver 344 through device driver 460. Operating system 430 also includes a BIOS 402 to run standard start up routines for the remote unit 15.

A variety of application programs can be included in the operating system. One such application is a WLAN auto configuration program. Since the remote unit 15 can be associated with a single WLAN having base stations 12, 13, 14, or multiple unrelated WLANs having multiple unrelated base stations, it is necessary for the mobile unit 15 to be able to configure itself to adapt to and communicate with one or more of several possible WLANs within range. This auto configuration program can enable a user to store configurations for numerous WLANs such that when a user turns on the mobile unit 15, the program automatically loads the correct configuration for each of the WLANs that the mobile unit 15 detects that it is near. As the number of WLANs increase, it is very useful for the user to be able to connect to the WLAN where he is physically located without being required to use the time to manually change the computer's configuration settings to associate with the WLAN and Internet.

Figure 4:
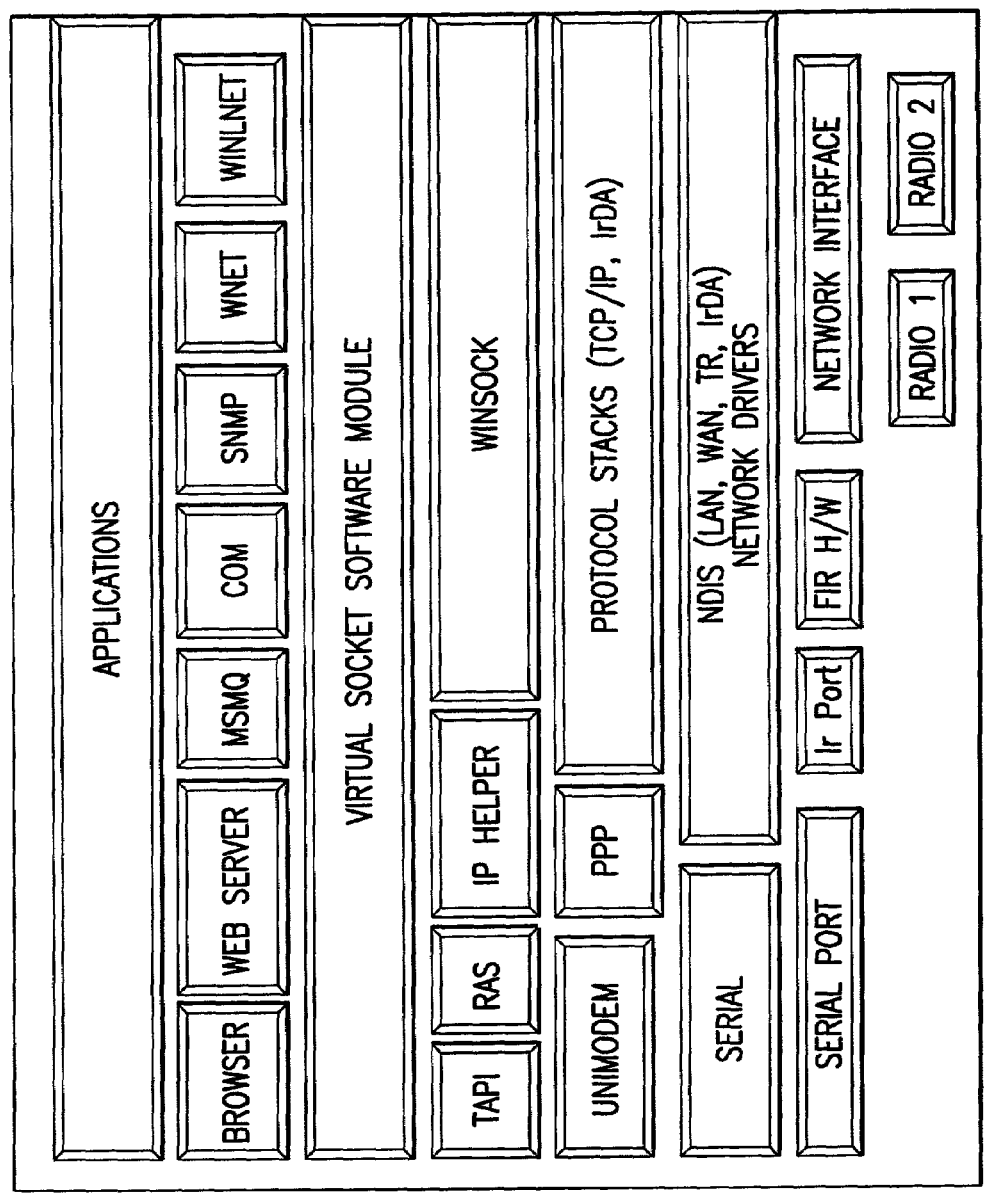
FIG. 4 illustrates the software architecture of a Windows CE mobile unit according to the present invention.

FIG. 4 illustrates the software architecture of a Windows CE mobile unit according to the present invention in which the Virtual Socket layer is implemented between the Winsock and the applications.

Figure 5:
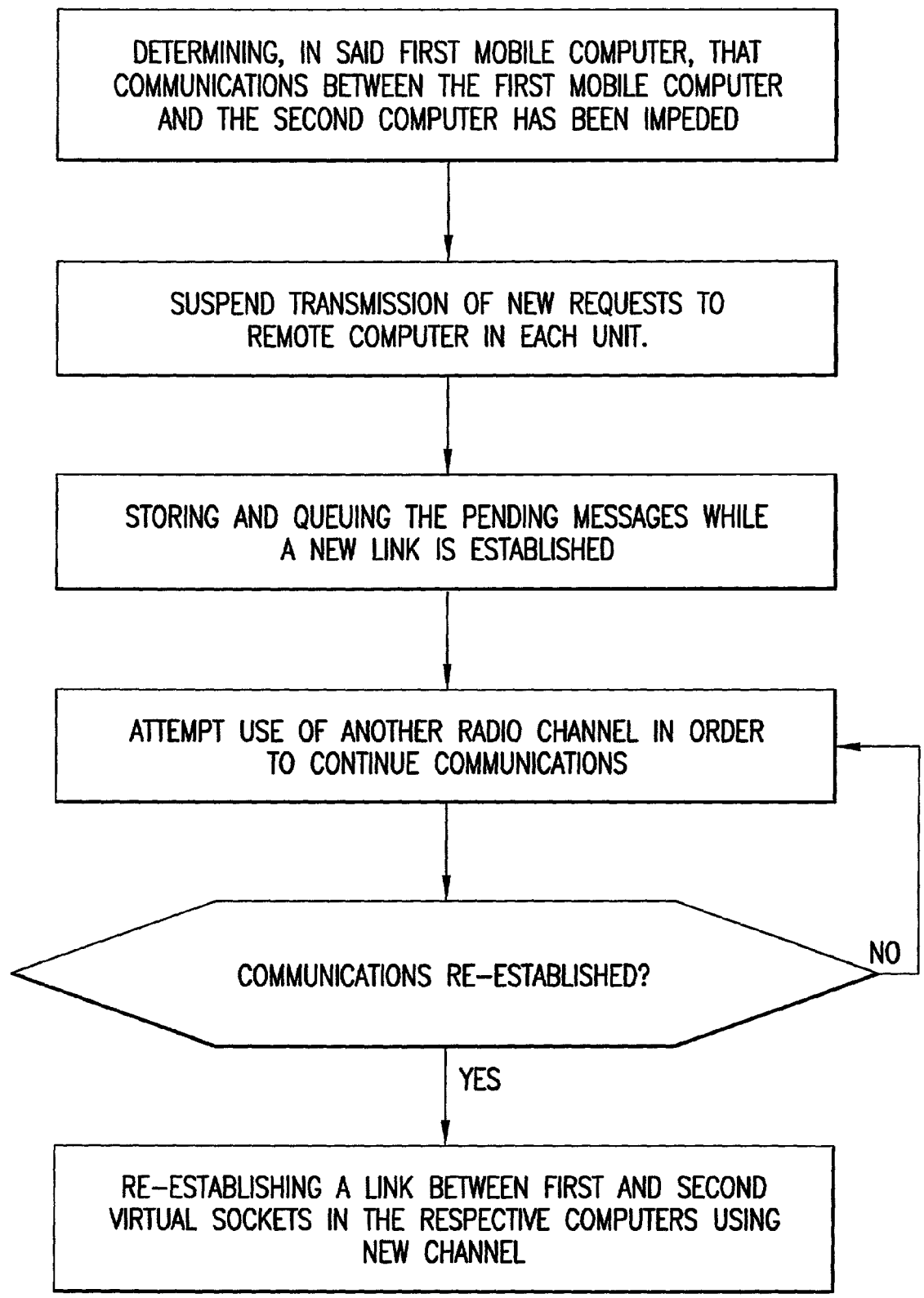
FIG. 5 illustrates a process flow diagram of a software and protocols according to the present invention.

FIG. 5 is a process flow diagram of the software according to the present invention. A method of maintaining connectivity and synchronization of data from a first application resident in a first mobile computer to a second application resident in a second computer wherein the data is transmitted over a data communications network including a plurality of stationary access points, determining, in said first mobile computer, that communications between the first mobile computer and the second computer has been impeded, and that association with a different access point or use of a different radio channel should be attempted in order to continue communications; storing and queuing the messages while a new link is established; and re-establishing a link between first and second virtual sockets in the respective computers in order to continue a session between the first and second applications in the first and second computer respectively.

One feature of the present invention is that the communications interface software module emulates a standard communications API, such as Winsock, so that calls to the standard communications API from legacy applications are capable of being processed by said software module. A typical example of a widely deployed software application used in mobile computers is a data collection application utilizing a bar code reader to input data to the computer.

Another feature of the present invention is the step of temporarily storing information received from the data collection application that is intended for transmission to the second computer, during such time that the communication session is suspended, and then subsequently transmitting the stored information to the second computer upon resuming the communication session. Following the step of resuming communications, the communications interface software module forwards all information received from the data collection application and intended for the second computer to the second computer.

More specifically, FIG. 5 depicts a flowchart of the process steps according to the present invention. It is assumed that there are software applications in both computers, which are executing and communicating with each other over a communication link. In one embodiment, at some point a communication link between both computers is impeded, or lost, and communication from one application to another is interrupted. The receiving application notices that the incoming data stream has stopped and immediately sends a interruption to a software module which initiates the recovery process according to the present invention. In another embodiment, the link does not have to be lost, but some other criteria is tested periodically to determine if another link should be used. The computer making such a determination then initiated the channel changing process according to the present invention.

The first process step is that a search is made for an alternative communication channel meeting certain criteria (e.g. bandwidth, reliability, coverage, quality of service, security, etc.). Simultaneously, the application which has been running on the computer is suspended so that the fact that data is no longer received by the application being received does not cause a halt or other malfunction in the application program. With the application program properly suspended, a search can be made for an alternative channel over as long as period of time as is necessary in order to complete a new link. Such a search for an alternative communication channel can be made according to techniques known in the art by using different communication programs searching for different channels, different frequencies, or different networks. Assuming that a new channel is found which re-establishes communication to the remote computer, an acknowledgement is received by the sending computer, that the channel is acceptable to the receiving computer and the alternate link is established.

At one of the computers, it may be noted that no acknowledgement has been received for the data being sent to the other computer. An interrupt may also be received that a signal has come in on an alternative communication channel, indicating that the normal communications channel between the communicating applications has been impeded or lost. In either event, the application running on each of the remote computers is suspended and put into a temporary state pending reconstruction of the new communication channel. At this point, the virtual socket API, as provided in the present invention, enables re-establishment of communication between application programs through a new socket and new physical communications channel. More specifically, a new or virtual socket is established in the remote computer which replaces the physical socket over which the application program has utilized formerly for communication. The new or virtual socket therefore transfers data over the higher levels of the protocol stacks directly to the new communication channel, thereby bypassing or ignoring the first physical socket. Meanwhile, at the other computer, a corresponding virtual socket has been set-up and communication is established between the application program running on such computer and the virtual socket. The virtual socket is in communication with the new communicating channel and initialization routine is set-up in order to re-establish communication between the application programs over the new communication channel utilizing the two corresponding virtual sockets. Once such reinitializing program has been completed, the pending application programs in each respective computer can be taken out of the suspend mode, and communication re-established at the point at which the application programs have been suspended. Thus, according to the present invention and in distinction to the prior art, re-establishment of communication channel through new sockets is implemented in each of the corresponding computers without making use of a central controller or other type of intermediate controller or gateway. Such software applications allows communication between two computers to be re-established regardless of the specific type of communication network, or the facilities available in such networks.

Another embodiment of the present invention is one in which the mobile computer is connected to an access point or communication controller such as used in local area networks. In such embodiment, it is possible to utilize the communication controller under control of the remote unit in order to search out an alternative communication path. More specifically in such an embodiment the actual choice of the communication links is not directly chosen by the mobile unit, but is controlled by a remote base station. The remote base station needs to be informed by the mobile unit concerning the criteria for acceptance in order to search for an alternative communication path from the communication controller to the other remote computer.

A more detailed description of this embodiment of the invention, using a communications controller, is a method of maintaining connectivity and synchronization of data from a first application resident in a first mobile computer to a second application resident in a second computer wherein the data is transmitted over a data communications network including a plurality of stationary access points and at least one communications controller in communication with the access points, and a plurality of remote mobile computers, at least some of the mobile computers being capable of communicating with at least two of the access points when located within a predetermined range therefrom and being normally associated with and in communications with a single one of such access points, each mobile computer having a unique user address, comprising:

(A) establishing communication and association between a first mobile computer with a first access point and with said communications controller associated with such access point through an associated port of the communications controller;

(B) registering the user address of said first mobile computer with said communications controller;

(C) utilizing the communications controller for processing messages destined for the first mobile computer and transferring such processed messages through the communications controller to the associated access point and the first mobile computer;

(D) establishing a first virtual and real sockets in the first computer in response to each connection request by the first application for processing data originated by the first application and corresponding second virtual and real sockets in the second computer to enable a connection between the first computer to a second application in the second computer over the external communication link;

(E) establishing in the second computer a second virtual socket for each connection request by the first application wherein the second virtual socket corresponds to a first virtual socket established in the first computer;

(F) subsequently determining, in said first mobile computer, that communications between the first mobile computer and the second computer has been impeded, and that association with a different access point or use of a different radio channel should be attempted in order to continue communications;

(G) storing and queuing the messages while a new link is established; and (H) re-establishing a link between said first and second virtual sockets in order to continue a session between the first and second applications in the first and second computer respectively.

The steps of determining includes detecting which other communication networks are available for establishing a new communication link.

For example, the first radio link utilizes TDMA and the second radio link utilized GSM, or the first radio link couples to a packet switched network and the second radio link couples to a circuit switched network.

An other import ant application on the mobile unit is a web browser.

The web browser communicates with a client-side intercept module. The web server communicates with a server-side interrupt module. The client-side interrupt module then communicates with the server-side interrupt module over the communication link. The web browser and the client-side intercept module are contained in the mobile computer. The server-side intercept module and the web server may be contained in a host computer on the network. The first mobile computer and the second computer communicate over the wireless network, and an external communication link.

Preferable, the web browser is an Internet web browser utilizing hypertext transfer protocol (HTTP) and hypertext markup language (HTML) to communicate with an Internet web server which also uses HTTP and HTML. In operations, the web browser would output an HTTP data stream which is intercepted by the client-side intercept module. The intercept of the HTTP data stream by the client-side intercept module may be accomplished through the use of the TCP/IP loop-back feature where the client side intercept module resides at an IP address having a network number of 127, such as 127.0.0.1. The client-side intercept module then converts or transforms the HTTP data stream into a client/server specific protocol and transmits the client/server specific data stream onto the external communication link. The server-side intercept module receives the client/server specific data stream and reconstructs the original HTTP data stream corresponding to the web browser originated communication. This reconstructed HTTP data stream is then transferred to the web server. The web server responds to the HTTP data stream in the normal manner of the Internet web server. As will be appreciated by one of skill in the art, the web server may also be proxy which allows multiple browsers to connect to the server.

In one embodiment of the present invention, the web browser communicates to the client-side intercept module using the Transmission Control Protocol/Internet protocol (TCP/IP). TCP may also be used for a communication between the client-side intercept module and the server-side intercept module over the external communication link. Finally, TCP may be used for communication between the server-side intercept module and the web server. While TCP may be used for communication between the various components that make up the system of the present invention, the HTTP protocol does not provide the most efficient means for communication over an external communication link, one embodiment of the present invention creates what are referred to herein as "virtual sockets" which are utilized in the connection between the web browser and the client-side intercept module and the web server. The operation of these virtual sockets will not be described subsequently.

In a Windows® implementation, the program includes a window in the Windows environment similar to control panel or Dial-Up networking. The program seamlessly blends into the operating system. The Windows shell uses a single hierarchical name space to organize all objects such as files, storage devices, printers, network resources, and anything else that can be viewed using an application such as Windows Explorer.

An Internet protocol address (IP address) contained in the packet header is exemplary of an identification address which can be used to address packets of data which are to be routed over a network using TCP/IP protocol to a network station. The IP address is, of course utilized when transmission are made pursuant the Internet Protocol. Analogous network addresses are used when data is to be transmitted pursuant to other protocols, such as the Novel IPX protocol, or the X.25 protocol.

One aspect of the present invention is to be able to provide the current network address of a specific wireless mobile unit that communicates with the server following a period of time when it has been off the network, based upon the name or identity of the user, and a database look-up. This feature is particularly useful in applications and environments in which the wireless mobile units are moved from network to network. Such applications are also important in wireless network environments to control entry into a network and authorize association of wireless terminals on the network. Since the communications protocols for wireless networks are typically open standards, interoperable terminals belong to unauthorized users in range of a network access point may be able to communicate with or listen to the network traffic, or utilize the network to communicate over private network facilities and channels. In the case of a network using the IP protocol, the network address would be the IP address. For full generality, we use the term "network address" in the discussion that follows, although in the preferred embodiment that network address would be the IP address.

The process of assigning an network address to a wireless terminal may be performed by a domain name server (DNS) or a dynamic host configuration protocol (DHCP) server connected to the network. Such services provide domain name to network address translation and temporary assignment of a network address to the mobile unit. Alternatively, the set of available network addresses may be stored internally in a memory in the terminal itself, and a specific network address released to the user that is associated with the user's identification.

The formation and maintenance of an ESS makes use of a registration service that is accessed via the Service Location Protocol (SLP, RFC 2608). The registration service for each ESS maintains a list of all the APs in the ESS and a mapping of their BSSIDs to their IP addresses on the DSM. To become part of an ESS, an AP must register itself and provide both its BSSID and DSM IP address to the registration service. This action is performed in response to an IAPP-INITIATE request at the IAPP SAP.

An ESS is a set of Basic Service Sets (BSSs) that form a single LAN, allowing an 802.11 mobile station to move transparently, from one BSS to another, throughout the ESS. The establishment of the first AP in the DS accomplishes the formation of an ESS. The AP is started, and an IAPP-IMTATE. request is issued. The use of 802.1X is required to authenticate with the DS. A search is made in the registration service for the SSID. If this is the first AP in the ESS, the AP will use the SSID that was passed into the service primitive to initialize the registration service for the ESS. The AP provides its BSSID (MAC address) and UDP port number, as well as its IP address to the registration service. If an AP is behind a NAT the address registered is the incorrect address i.e. the private address rather than the globally reachable address, except if there is more than one AP behind a NAT in which case the other APs behind the NAT require the private address and the APs on the global site of a NAT require the global address.

Management Entities can query the registration service to obtain information about each of the APs in the registration service. The registration service may be able to manage one or more ESSs, but only one registration service manages a given ESS. The SSID may reflect the nature/boundaries of the ESS. As each AP deregisters, the registration service removes the entry for that AP. When the last AP is removed for an ESS, the registration service removes the SSID entry as well.

Figure 6:
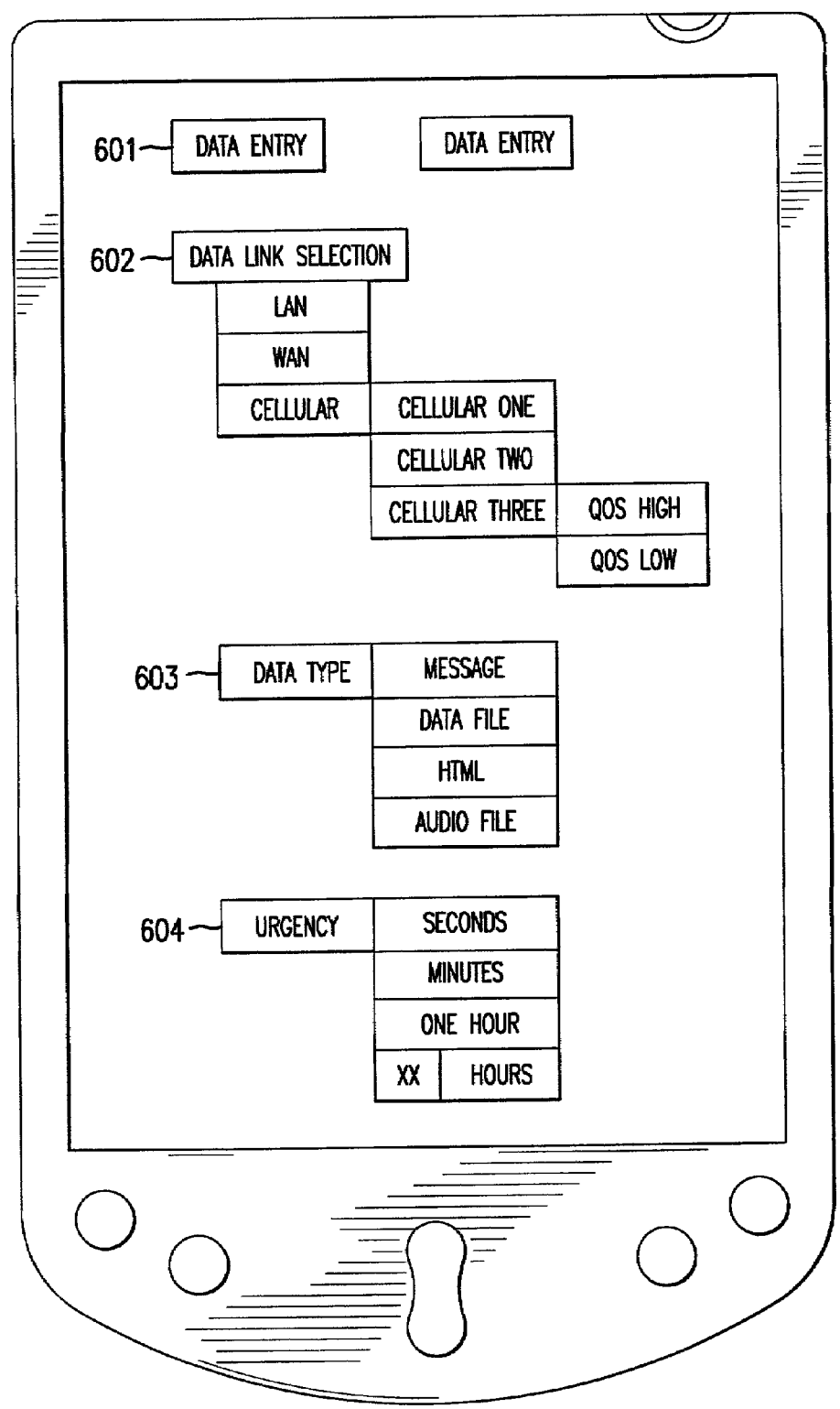
FIG. 6 illustrates a screen shot of the display in the mobile unit depicting a form or template which allows a user to enter data by bar code scanning for use in an application, and configuring the software for specifying communications channel criteria according to the present invention.

FIG. 6 shows a view of the screen of a mobile terminal including a scan data entry field, and menu selections for configuring the communications software according to the present invention. The windows at the left correspond to the profile selected by the user for scan data entry, such as customer name, company, location, product, action required, and so on. The windows to the immediate right such variable comprise either pull down menu items corresponding to the options which may be chosen by the user to correspond to such variables, or as an open item for scan data entry. For example, window item 601 indicates the data entry field from the data collection input, such as a scanned bar code. Window number 602 indicate the data link to be used for that is, a LAN a WAN, or a cellular telephone network, with a pull-down menu to select a carrier. Window 603 indicates the data type of the message to be sent such as a text or numeric message, data file, HTML file, or audio file and window 604 specifies the urgency in terms of time by which the message is to be delivered. In the specific application illustrated, the scan data entry fields could include items such as a customer name, company name, product, model number, quantity, delivery data, rice, and so forth which may be customized by the user using a profile, so that the scanned data convey to the destination station the desired data and a form according to the profile information.

Although the illustration of the screen shot with the profile and scan data entry parameters chosen for a typical data capture, and database customer inquiry application is purely exemplary, various other screen designs and window arrangements for conveying information to the user would be known to those skilled in the art. The key feature of the present invention is that various fields of the screen profile provided on the screen template or display are utilized by data capture from the scanning of a bar code symbol containing encoded text or encoded data representing information to be placed in such template field or location. After such entry has been visually verified by the user on the display of the mobile unit, the user then is immediately able to execute an application, and communicate with a remote station by program control means, a single point and click, or pressing a function key or "send data" button on the mobile unit.

The automatic data capture of information through bar code reading, automatic periodic comparison of communications link in a priority order selected by the user in a form template presented as a GUI on the screen of the mobile unit, and the automatic, transparent reconfiguration of the wireless data link at times selected by the user at the mobile terminal is a key aspect of the present invention which is believed to provide simplicity of use, efficiency of use of bandwand and cost effective savings in the data capture, database browsing and information transfer processes contemplated for many different user applications.

Another aspect of the present invention is to utilize a graphical user interface which enables a user to develop a specify scanning, data link, application type, or other notification operational parameters for a mobile unit through the use of icons, buttons, meters, slides, or other objects implemental on a interactive display. For example, for the data link selection, the present invention may also provide an interactive display to the user depicting a graph or list of the carriers, servers, networks, or users, wherein points represent mobile units, network nodes, gateways, service providers, radio paging services, or other well known designated network units together, while lines represent channels, links, or other connectivity media. The user may define the message delivery architecture by pointing and clicking, or drag and dropping, on such objects on the display as is well known in the art so as to achieve the desired notification schedule. One such architecture is specified by a user, it may be implemented as a software file and sent to the actual various network elements represented, along with activation schedules, to indicate the duration, context, or other bounds with which the message service is to be configured.

Various aspects of the techniques and apparatus may be implemented in digital circuitry, or in computer hardware, firmware, software, or in combinations of them. Apparatus of the invention may be implemented in computer products tangibly embodied in a machine-readable storage device for execution by a programmable processor, or on software located at a network node or website which may be downloaded to the computer product automatically or on demand. The foregoing techniques may be performed, for example, on a single central processor, a multiprocessor, one or more digital signal processors, gate arrays of logic gates, or hardwired logic circuits for executing a sequence of signals or program of instructions to implement aspects of the invention by operating on input data and generating output. The methods may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICs).

It will be understood that each of the elements described above, or two or more together, also may find a useful application in other types of constructions differing from the types described above.

While the invention has been illustrated and described as embodied in a communications network, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A method of maintaining connectivity and synchronization of data transmitted over a communications network, comprising the steps of:
    a) displaying a graphical user interface having data fields on a mobile computer terminal;
    b) automatically capturing symbol data by electro-optically reading bar code symbols, and filling in at least one of the data fields with the symbol data;
    c) configuring delivery of the data by manually entering, into other of the data fields, delivery data identifying a selected carrier, a selected data type, and a selected delivery time;
    d) transmitting the data, including the symbol data and the delivery data, of the selected data type from the mobile terminal via the selected carrier at the selected delivery time over an initial communications channel to a remote host computer;
    e) determining, in the mobile terminal, whether transmission of the data over the initial channel is impeded;
    f) suspending transmission of further data after determining that data transmission over the initial channel has been impeded;
    g) storing and queueing the further data in the mobile terminal;
    h) establishing an alternative communications channel between the mobile terminal and the host computer; and
    i) transmitting the further data stored in the mobile terminal to the host computer over the alternative communications channel.

2. The method of claim 1, wherein the transmitting steps are performed over wireless channels.

3. The method of claim 1, wherein the initial channel has criteria selected from a group consisting of bandwidth, reliability, coverage, quality of service and security; and wherein the determining step is performed by detecting a degradation in at least one of said criteria.

4. The method of claim 1, wherein the initial and the alternative channels are separate channels operating at different radio frequencies.

5. The method of claim 1, wherein the mobile terminal executes a resident web browser application for accessing and displaying files and data available on the Internet and other networks.

6. The method of claim 5, wherein the browser application is operative for displaying the further data stored in the mobile terminal.

* * * * *